(12) United States Patent
Nagai et al.

(10) Patent No.: US 7,091,426 B2
(45) Date of Patent: Aug. 15, 2006

(54) OCCUPANT WEIGHT DETECTION SYSTEM HAVING LINKED WEIGHT DETECTION MEANS WITH MAINTAINED POSITIONAL RELATIONSHIPS

(75) Inventors: Makoto Nagai, Wako (JP); Mikihito Kojima, Wako (JP)

(73) Assignee: Honda Motor Co., Ltd., Wako (JP)

( * ) Notice: Subject to any disclaimer, the term of this patent is extended or adjusted under 35 U.S.C. 154(b) by 219 days.

(21) Appl. No.: 10/800,310

(22) Filed: Mar. 11, 2004

(65) Prior Publication Data

US 2004/0238231 A1    Dec. 2, 2004

(30) Foreign Application Priority Data

Mar. 11, 2003    (JP)    ............................. 2003-065483

(51) Int. Cl.
*B60R 21/015*    (2006.01)
*G01G 19/08*    (2006.01)

(52) U.S. Cl. ........................ 177/144; 180/273; 280/735
(58) Field of Classification Search ................ 177/136, 177/144; 180/273; 280/735
See application file for complete search history.

(56) References Cited

U.S. PATENT DOCUMENTS 5,991,676 A * 11/1999 Podoloff et al. .............. 701/45
6,039,344 A * 3/2000 Mehney et al. ............. 280/735
6,092,838 A * 7/2000 Walker ........................ 280/735
6,161,891 A * 12/2000 Blakesley ................. 296/65.01
6,231,076 B1 * 5/2001 Blakesley et al. ........... 280/735
6,559,392 B1 * 5/2003 Haynes et al. .............. 177/144
6,921,108 B1 * 7/2005 Kojima et al. .............. 280/735

FOREIGN PATENT DOCUMENTS

| JP | 11-1153 | 1/1999 |
|----|---------|--------|
| JP | 11-94637 | 4/1999 |
| JP | 2002-516631 | 6/2002 |
| JP | 2003-83798 | 3/2003 |

\* cited by examiner

*Primary Examiner*—Randy W. Gibson
(74) *Attorney, Agent, or Firm*—Hamre, Schumann, Mueller & Larson, P.C.

(57) ABSTRACT

In an occupant weight detection system, a pair of weight detection units are mounted along upper faces of base members fixed to a floor of an automobile. A square-frame-shaped linking member made of an iron sheet is interposed between the pair of weight detection units and a pair of seat rails. The pair of weight detection units are integrally linked by the linking member to maintain a positional relationship to each other at a predetermined relationship. Therefore, it is possible to prevent these weight detection means from being mounted in a state in which they are twisted or displaced relative to each other, thereby maintaining the detection accuracy.

5 Claims, 13 Drawing Sheets

OCCUPANT WEIGHT DETECTION SYSTEM HAVING LINKED WEIGHT DETECTION MEANS WITH MAINTAINED POSITIONAL RELATIONSHIPS

BACKGROUND OF THE INVENTION

1. Field of the Invention

The present invention relates to an occupant weight detection system that includes a plurality of weight detection means for sharing detection of the weight of an occupant seated on a vehicle seat.

2. Description of the Related Art

Operation/non-operation of an airbag system for a passenger seat and variation of the deployment speed of an airbag, etc. are controlled according to the body size of an occupant seated on the passenger seat and whether or not an occupant is present, that is, according to the status. For example, control is carried out as follows: when the occupant is an adult or a child, the airbag system is operated, and when the occupant is an infant seated on a child seat or there is no occupant seated, the airbag system is not operated; furthermore, when the airbag system is operated, if the occupant is an adult the airbag is deployed at a high speed, and if the occupant is a child the airbag is deployed at a low speed. This enables the airbag system to exhibit a restraining performance that is optimum for the status of the occupant, thereby avoiding unnecessary deployment of the airbag.

An arrangement in which the above-mentioned status is determined based on the weight of an occupant detected by a single load cell provided in a seat is known from Japanese Patent Application Laid-open No. 11-94637. In this weight detection system, the weight of an occupant seated on the seat is applied to the single load cell via a link mechanism, thereby preventing the occurrence of detection error due to the posture of the occupant seated in the seat while minimizing the number of load cells.

The above-mentioned conventional arrangement has the problem that it is necessary to employ a complicated link mechanism in order to reduce the number of load cells to one; this problem can be solved by arranging weight detection units beneath left and right seat rails, and obtaining the weight of an occupant by adding the weights detected by the left and right weight detection units. However, when the left and right weight detection units are separate and are independently mounted on a vehicle body, it is difficult to maintain the precision with which they are mounted on the vehicle body, and there is a possibility that the left and right weight detection units might be twisted or displaced relative to each other, thereby affecting the detection accuracy.

SUMMARY OF THE INVENTION

The present invention has been carried out under the above-mentioned circumstances, and an object thereof is to mount in a correct positional relationship a plurality of weight detection means of a weight detection system for detecting the weight of an occupant, thereby improving the detection accuracy.

In order to achieve the above-mentioned object, in accordance with an aspect of the present invention, there is proposed an occupant weight detection system that includes a plurality of weight detection means for sharing detection of the weight of an occupant seated on a vehicle seat, and a linking member for integrally linking the plurality of weight detection means so that these weight detection means maintain a predetermined positional relationship to each other.

In accordance with the above-mentioned arrangement, since the plurality of weight detection means are integrally linked by the linking member so as to maintain the predetermined positional relationship to each other, it is possible to prevent these weight detection means from being mounted in a state in which they are twisted or displaced relative to each other, thereby maintaining the detection accuracy.

Weight detection units $12i$ and $12o$ and a weight sensor 37 of embodiments correspond to the weight detection means of the present invention.

The above-mentioned object, other objects, characteristics, and advantages of the present invention will become apparent from an explanation of preferred embodiments that will be described in detail below by reference to the attached drawings.

BRIEF DESCRIPTION OF THE DRAWINGS

FIG. 1 to FIG. 6 show a first embodiment of the present invention.

DESCRIPTION OF THE PREFERRED EMBODIMENT

Figure 1:
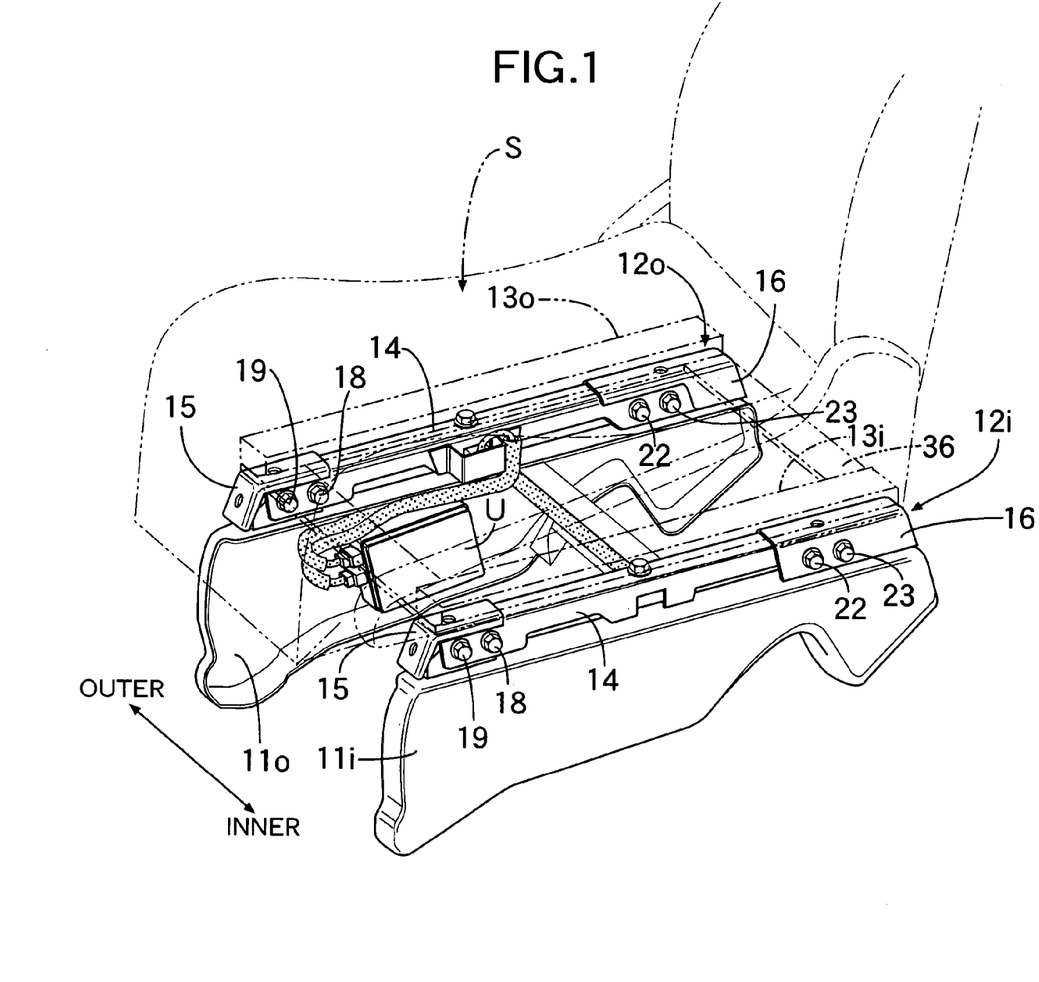
FIG. 1 is a perspective view of a weight detection system provided in a seat.

As shown in FIG. 1, a pair of base members $11i$ and $11o$ are fixed to the floor of a motor vehicle, and a pair of weight detection units $12i$ and $12o$ are mounted along the upper faces of the base members $11i$ and $11o$ respectively. A pair of seat rails $13i$ and $13o$ are fixed to the upper faces of the weight detection units $12i$ and $12o$, and support a seat S in a longitudinally movable manner. The suffix o here denotes a member that is present on the laterally outer side of a vehicle, and the suffix i denotes a member that is present on the laterally inner side.

Figure 2:
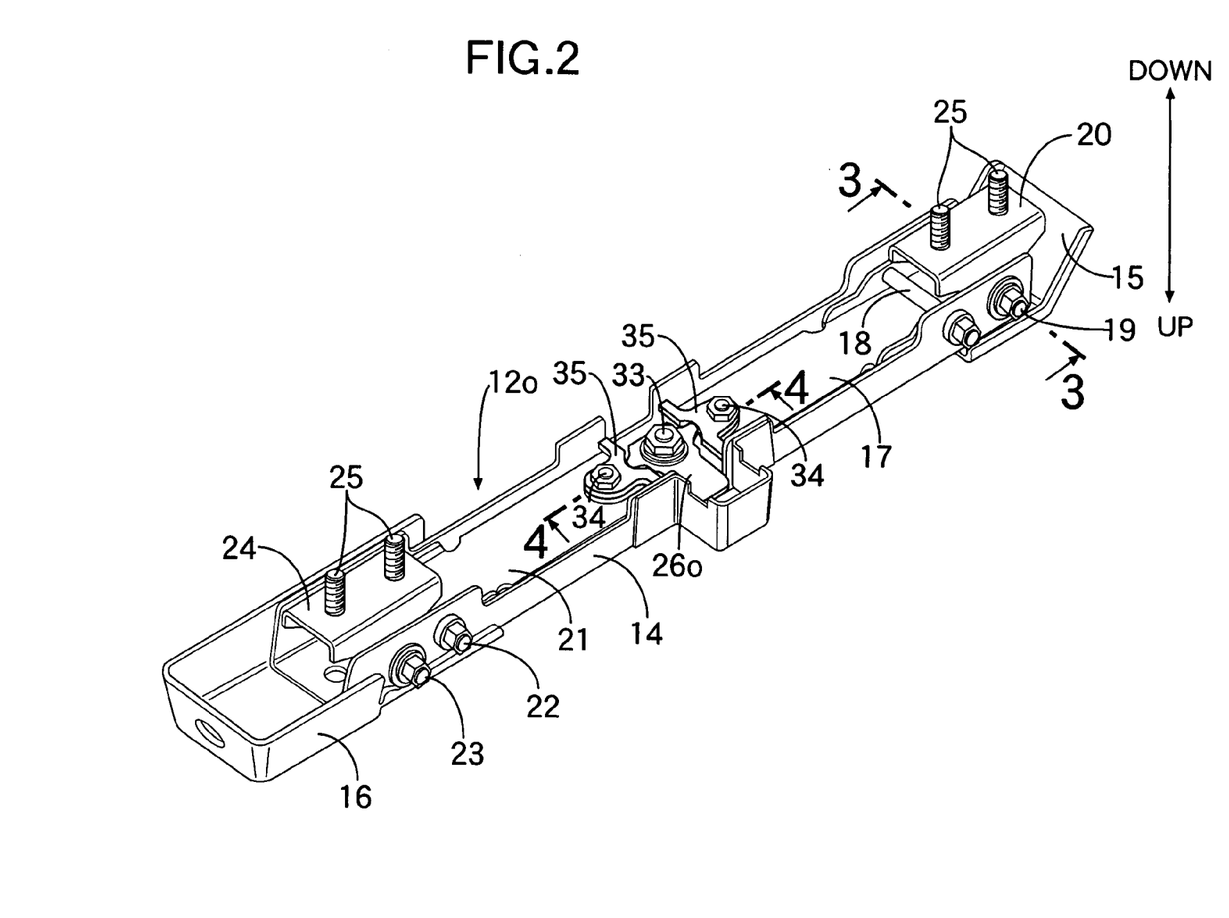
FIG. 2 is a view from the underside of a weight detection unit.

FIG. 2 shows the weight detection unit $12o$, which is present on the laterally outer side, when viewed from the underside.

Figure 3:
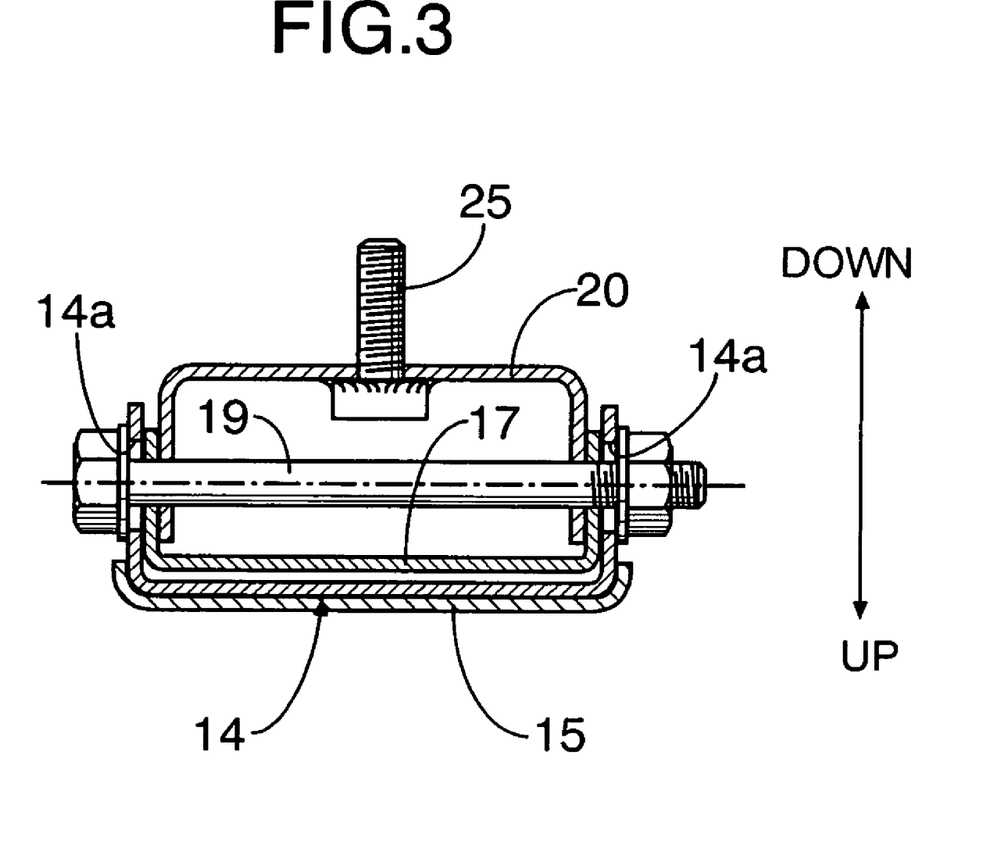
FIG. 3 is an enlarged cross-sectional view along line 3—3 in FIG. 2.

As is clear from FIG. 2 and FIG. 3, the weight detection unit $12o$ has a sensor housing 14 having a channel-shaped cross-section with the underside thereof open, and front and rear brackets 15 and 16 are provided at the front end and the rear end of the sensor housing 14, the seat rails $13o$ being joined to the front and rear brackets 15 and 16. A front arm member 17 is housed in a front half of the sensor housing 14; a position close to the front of the front arm member 17 is pivotably supported on the sensor housing 14 via a fulcrum pin 18, and a front load receiving member 20 is supported on the front end position of the front arm member 17 via a bolt 19. Similarly, a rear arm member 21 is housed in a rear half of the sensor housing 14; a position close to the rear of the rear arm member 21 is pivotably supported on the sensor housing 14 via a fulcrum pin 22, and a rear load receiving member 24 is supported on the rear end position of the rear arm member 21 via a bolt 23. The above-mentioned two bolts 19 and 23 run in a vertically movable manner through long holes 14a formed in the sensor housing 14. Each of the front and rear load receiving members 20 and 24 is fixed to the upper face of the base member 11o via two bolts 25.

Figure 4:
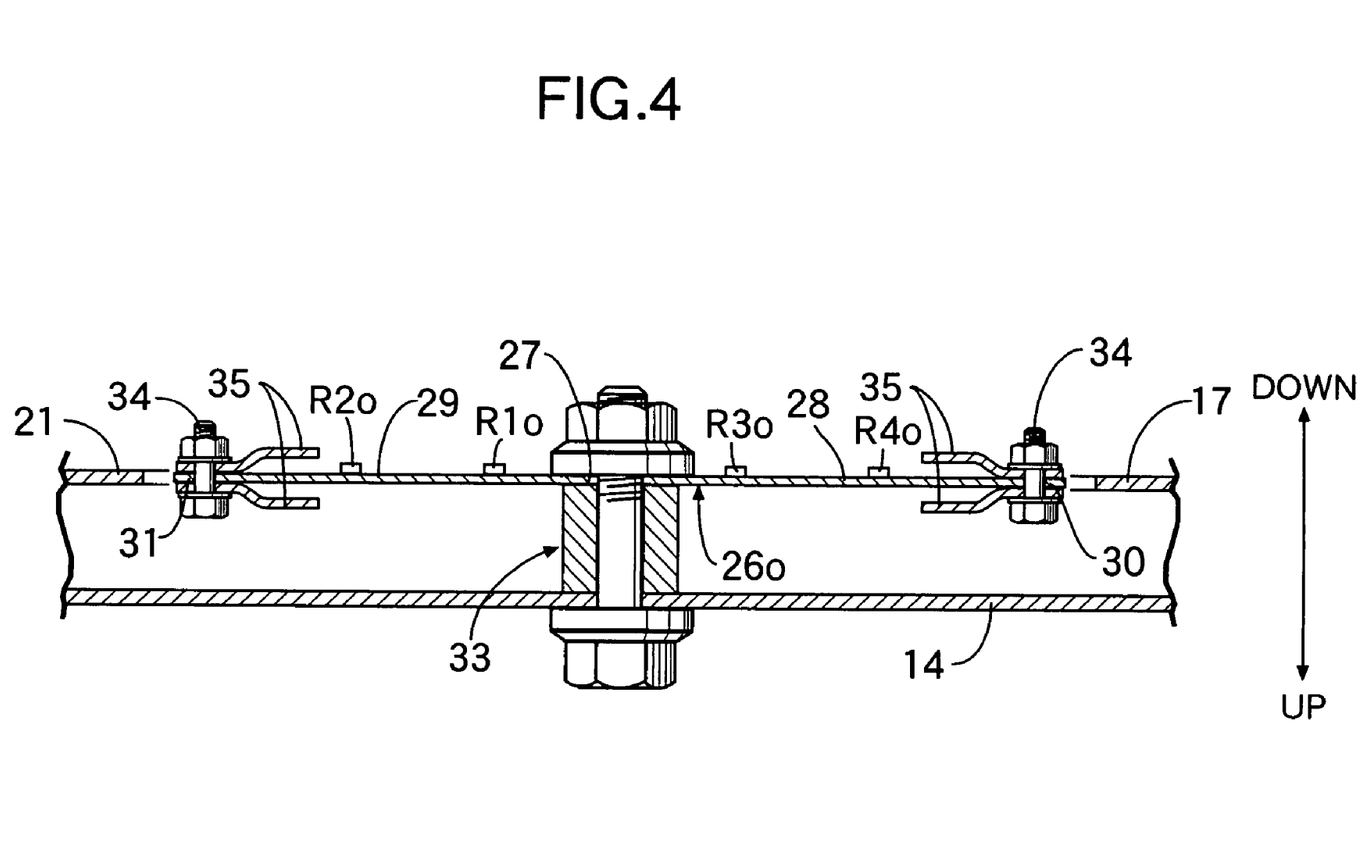
FIG. 4 is an enlarged cross-sectional view along line 4—4 in FIG. 2.
Figure 5:
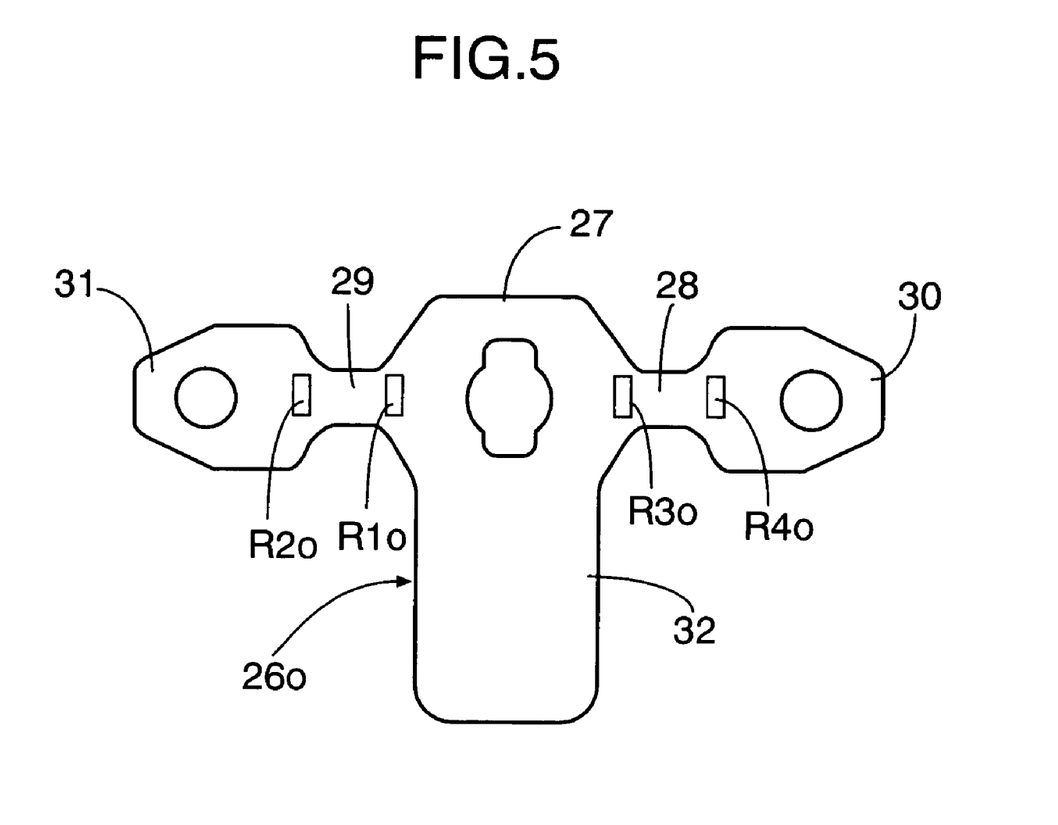
FIG. 5 is an underside view of a sensor plate.

As is clear from reference also to FIG. 4 and FIG. 5, a substantially T-shaped sensor plate 26o is provided in a middle section of the sensor housing 14. The sensor plate 26o includes a first fixing portion 27 in the middle, flex portions 28 and 29 extending from the front and rear of the first fixing portion 27, second fixing portions 30 and 31 extending from the front and rear of the flex portions 28 and 29, and a substrate portion 32 extending from one side of the first fixing portion 27. The first fixing portion 27 is fixed to the sensor housing 14 via a center post 33, and upper and lower linking plates 35 are fixed to the second fixing portion 30 at the front via a bolt 34 and secured to the rear end of the front arm member 17. Upper and lower linking plates 35 are fixed to the second fixing portion 31 at the rear via a bolt 34 and secured to the front end of the rear arm member 21.

Two strain resistors R1o and R2o are provided on the underside (the surface not facing the sensor housing 14) of the rear flex portion 29 of the sensor plate 26o, and two strain resistors R3o and R4o are provided on the underside (the surface not facing the sensor housing 14) of the front flex portion 28. Connected to the substrate portion 32 are various electronic components (not illustrated) connected to the four resistors R1o to R4o.

The structure of the weight detection unit 12i on the laterally inner side is the same as that of the weight detection unit 12o on the laterally outer side. The inner and outer weight detection units 12i and 12o share detection of the weight of an occupant in a substantially equal manner.

Figure 6:
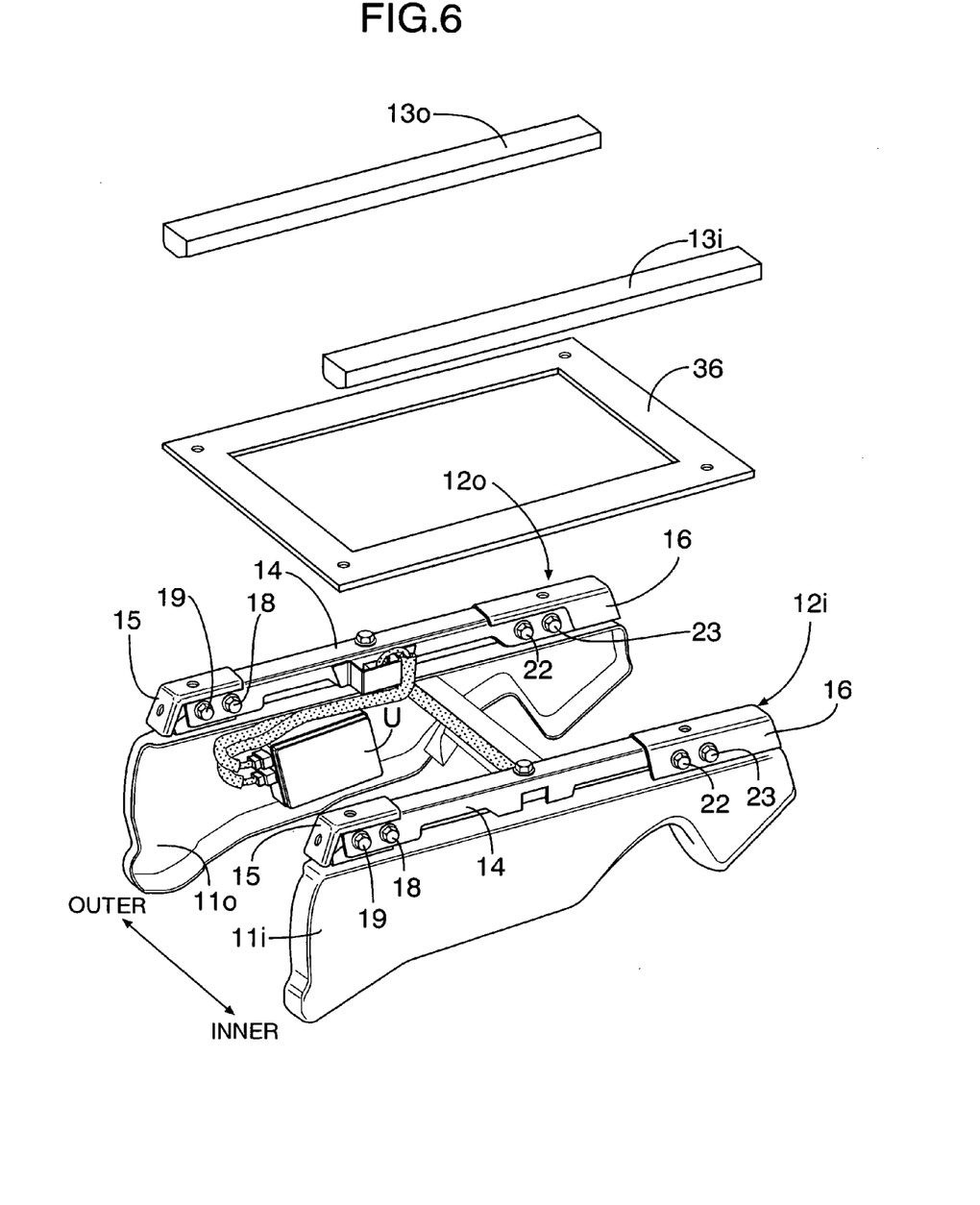
FIG. 6 is a partially exploded perspective view of FIG. 1.

As is clear from FIG. 1 and FIG. 6, a linking member 36 cut from iron sheet in a square frame shape is held and fixed between upper faces of the front and rear brackets 15 and 16 of the laterally inner and outer weight detection units 12i and 12o and lower faces of the laterally inner and outer seat rails 13i and 13o.

A method for detecting the weight of an occupant seated on the seat S by means of the two weight detection units 12i and 12o is now explained.

The weight detection unit 12o on the laterally outer side is explained below as example. When the weight of an occupant acts on the front load receiving member 20 and the rear load receiving member 24, the front arm member 17 and the rear arm member 21 swing with the fulcrum pins 18 and 22 as the centers, and the second fixing portions 30 and 31 of the sensor plate 26o connected to the ends of the front arm member 17 and the rear arm member 21 are pushed downward. As a result, since the second fixing portions 30 and 31 of the sensor plate 26o flex downward with the first fixing portion 27 fixed to the center post 33 as the center, the strain resistors R1o to R4o deform, and loads applied to the front and rear load receiving members 20 and 24, that is, parts of the weight of the occupant, are detected based on the change in the value of the electrical resistance.

When the weight detection unit 12i on the laterally inner side detects the remainder of the weight of the occupant in the same way, an electronic control unit U (ref. FIG. 1) adds detection values obtained by the laterally inner and outer weight detection units 12i and 12o, thus giving the weight of the occupant.

The linking member 36, which is interposed between the upper faces of the laterally inner and outer weight detection units 12i and 12o and the lower faces of the laterally inner and outer seat rails 13i and 13o, has a predetermined thickness and is not easily deformed, and the two weight detection units 12i and 12o, which are united via the linking member 36, are therefore maintained in a predetermined positional relationship without being twisted or displaced relative to each other. As a result, detection error due to the two weight detection units 12i and 12o being twisted or displaced can be eliminated, thereby maintaining the detection accuracy.

Figure 7:
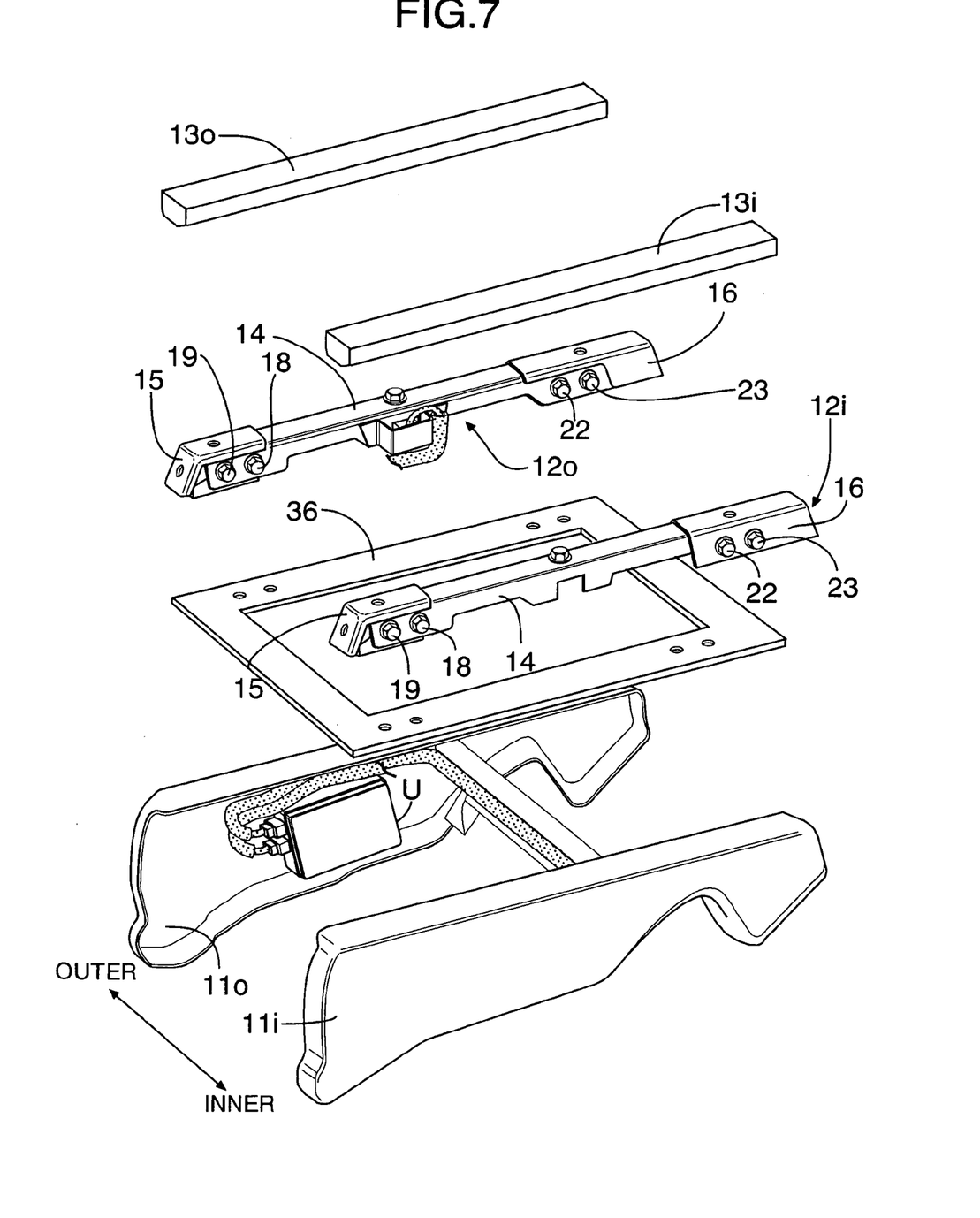
FIG. 7 is a view, corresponding to FIG. 6, of a second embodiment.
Figure 8:
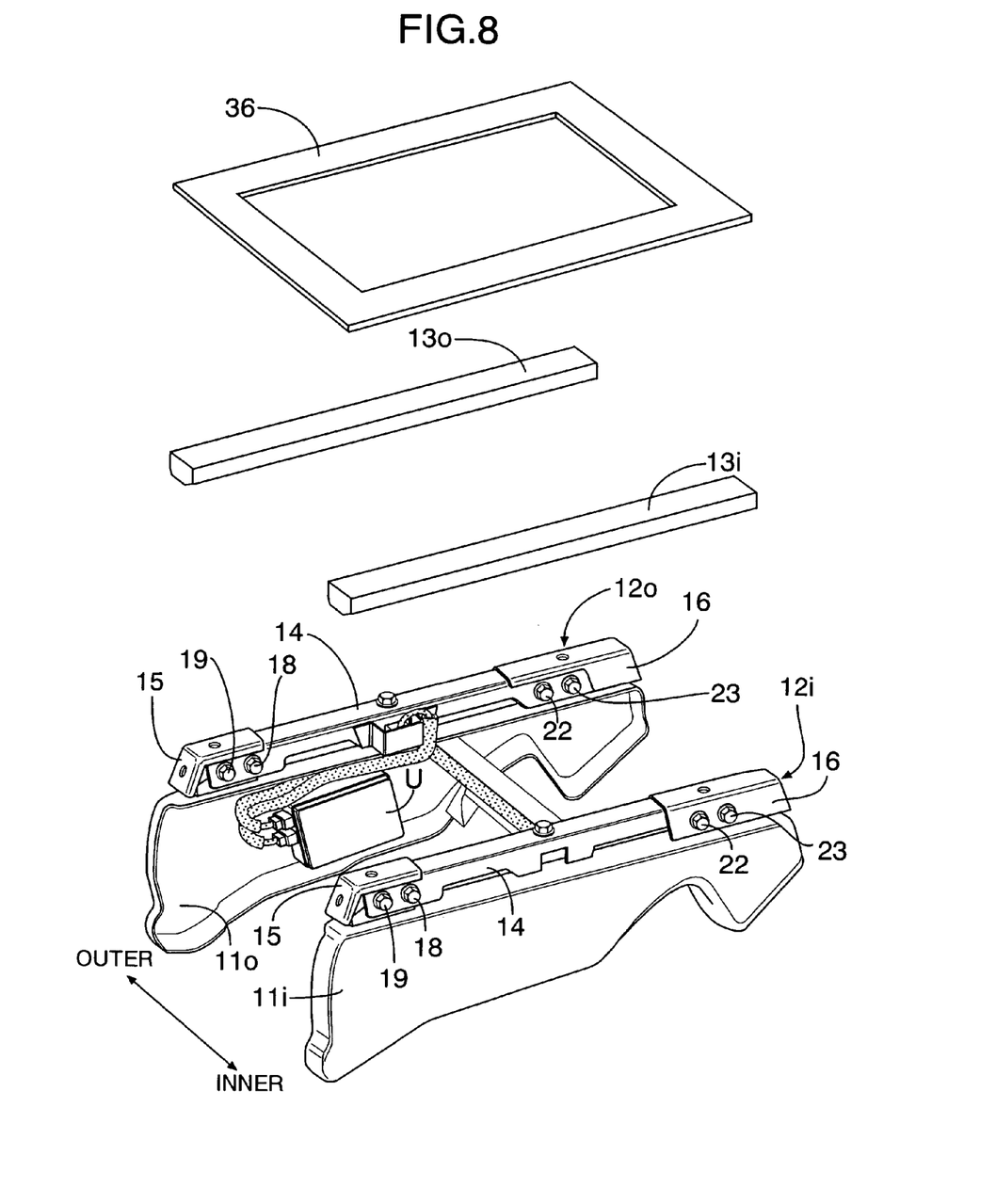
FIG. 8 is a view, corresponding to FIG. 6, of a third embodiment.

In the above-mentioned first embodiment, the linking member 36 is fixed to the upper faces of the front and rear brackets 15 and 16 of the laterally inner and outer weight detection units 12i and 12o, but as shown in a second embodiment of FIG. 7, laterally inner and outer weight detection units 12i and 12o may be united by interposing a linking member 36 between the undersides (that is, the undersides of front load receiving members 20 and rear load receiving members 24) of the two weight detection units 12i and 12o and base members 11i and 11o. Alternatively, as shown in a third embodiment of FIG. 8, securing a linking member 36 to upper faces of laterally inner and outer seat rails 13i and 13o enables two weight detection units 12i and 12o to be united indirectly via the seat rails 13i and 13o.

Figure 9:
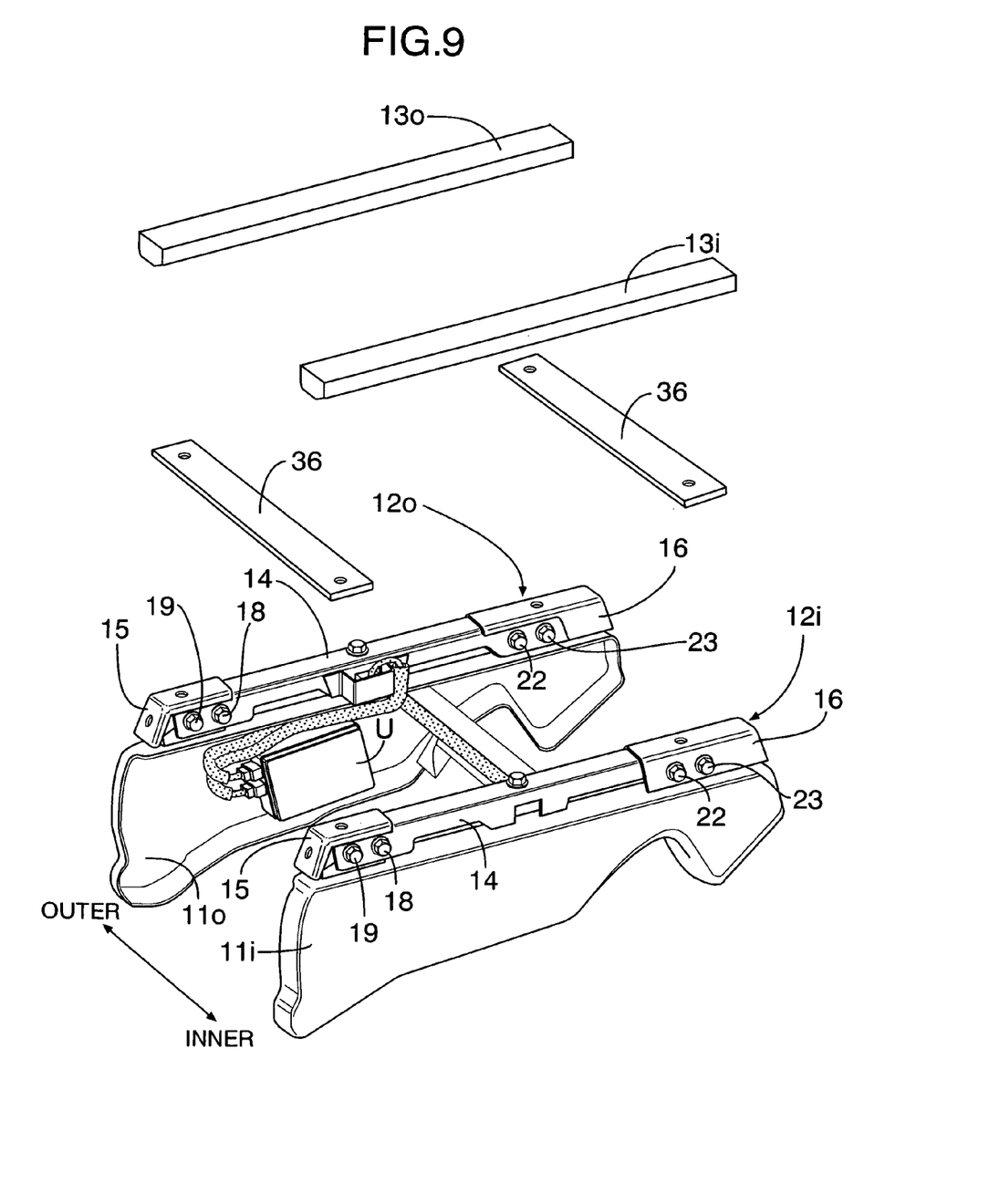
FIG. 9 is a view, corresponding to FIG. 6, of a fourth embodiment.

A fourth embodiment shown in FIG. 9 is a modification of the above-mentioned first embodiment which employs the linking member 36 formed in a square frame shape, and employs two strip-shaped linking members 36.

Figure 10:
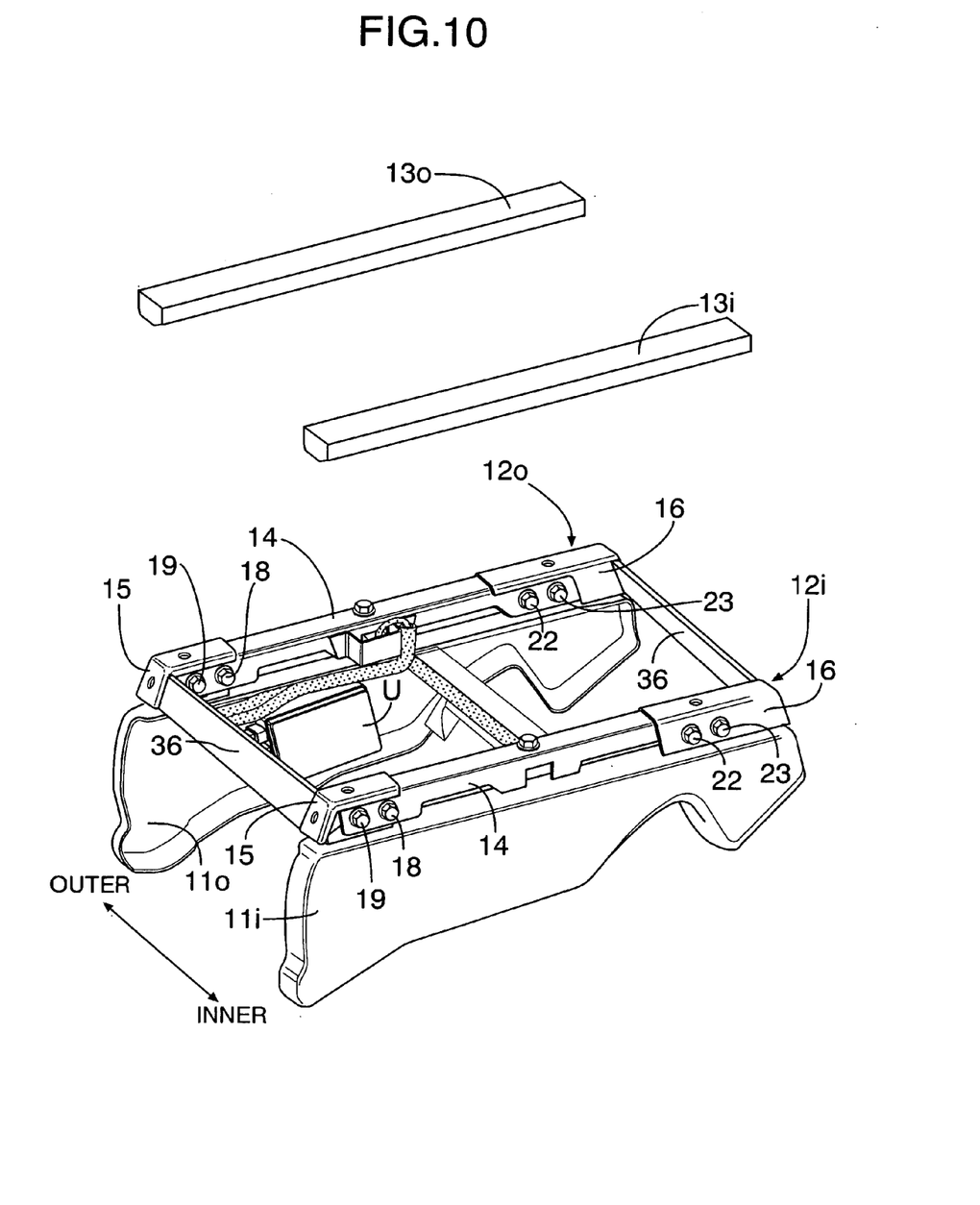
FIG. 10 is a view, corresponding to FIG. 6, of a fifth embodiment.

A fifth embodiment shown in FIG. 10 is a modification of the above-mentioned fourth embodiment, and weight detection units 12i and 12o are joined by connecting opposing sides of front and rear brackets 15 and 16 of the weight detection units 12i and 12o with two strip-shaped linking members 36, without the linking members 36 being interposed between the weight detection units 12i and 12o and seat rails 13i and 13o.

In accordance with these second to fifth embodiments, the same effects as those obtained in the first embodiment can be attained.

Figure 11:
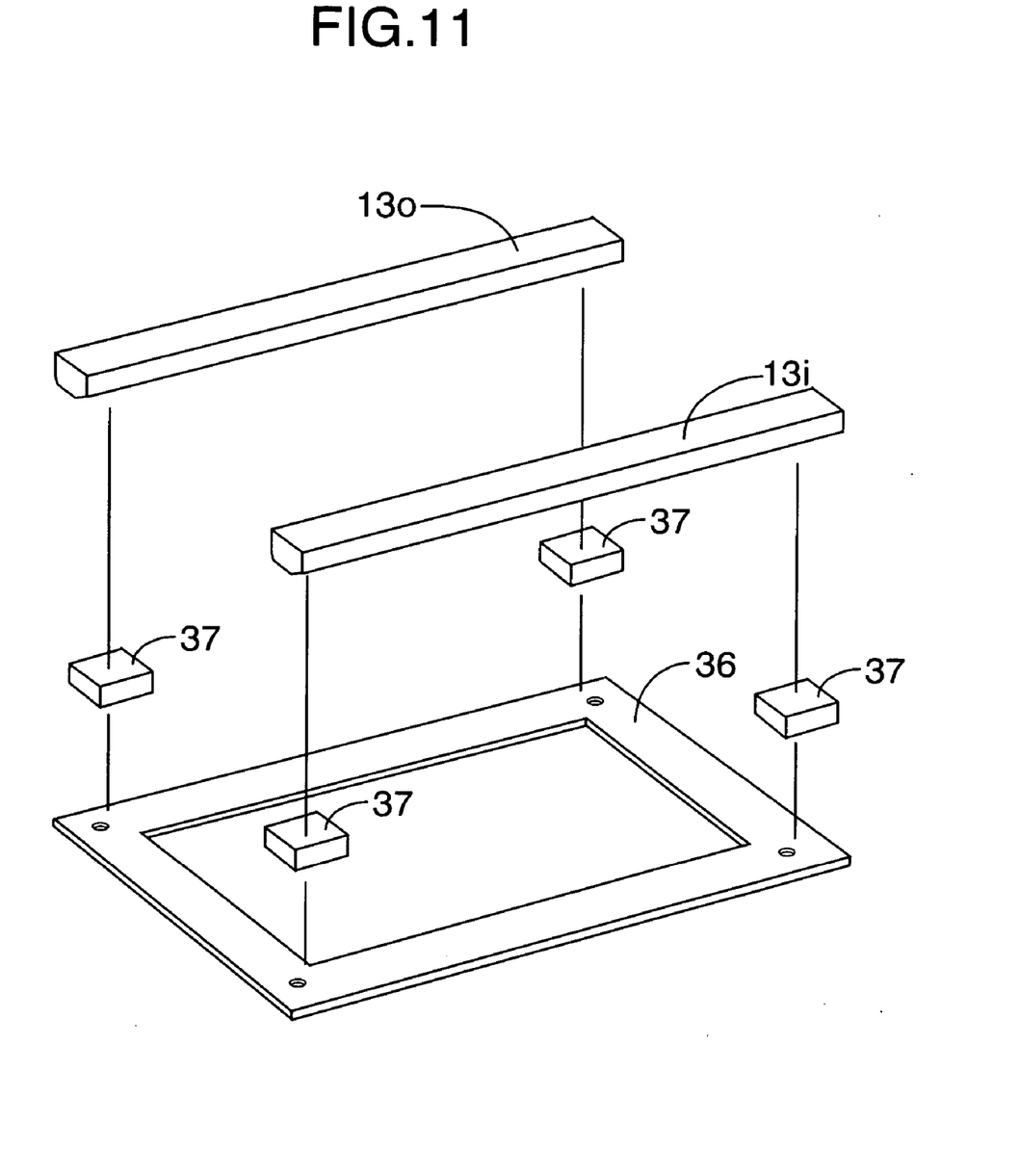
FIG. 11 is an explanatory diagram of a sixth embodiment.

In a sixth embodiment shown in FIG. 11, a total of four weight sensors 37 are disposed on lower faces at opposite ends of left and right seat rails 13i and 13o for supporting a seat in a longitudinally movable manner, and these weight sensor 37 are supported by the four corners of a square-frame-shaped linking member 36. Since the positional relationship of the four weight sensors 37 is held constant by the linking member 36, which is made of highly rigid iron sheet, detection error due to relative positional displacement, etc. of the four weight sensors 37 can be eliminated, thereby maintaining the detection accuracy.

Figure 12:
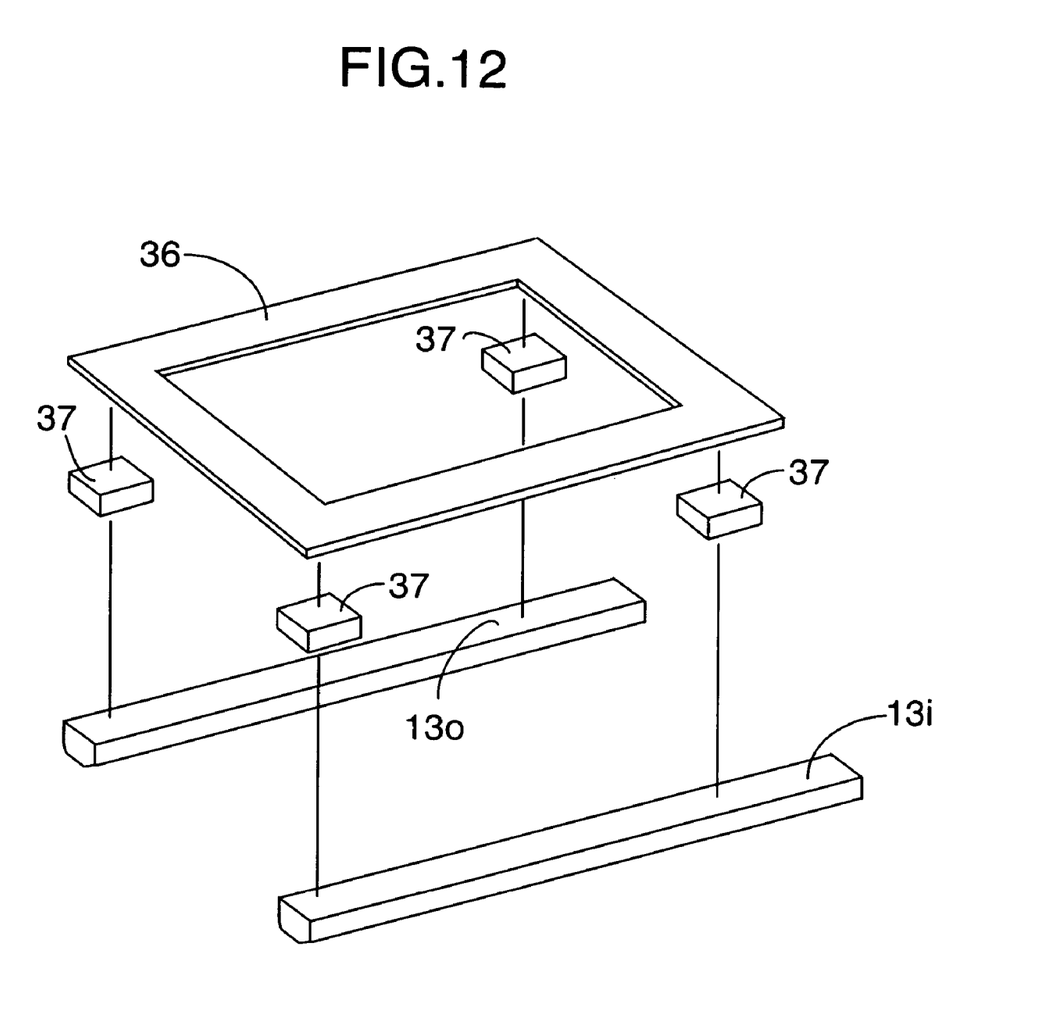
FIG. 12 is an explanatory diagram of a seventh embodiment.

In a seventh embodiment shown in FIG. 12, a total of four weight sensors 37 are disposed at the four corners on a lower face of a square-frame-shaped linking member 36 supporting a seat, and these weight sensors 37 are slidably supported on upper faces of left and right seat rails 13i and 13o.

Figure 13:
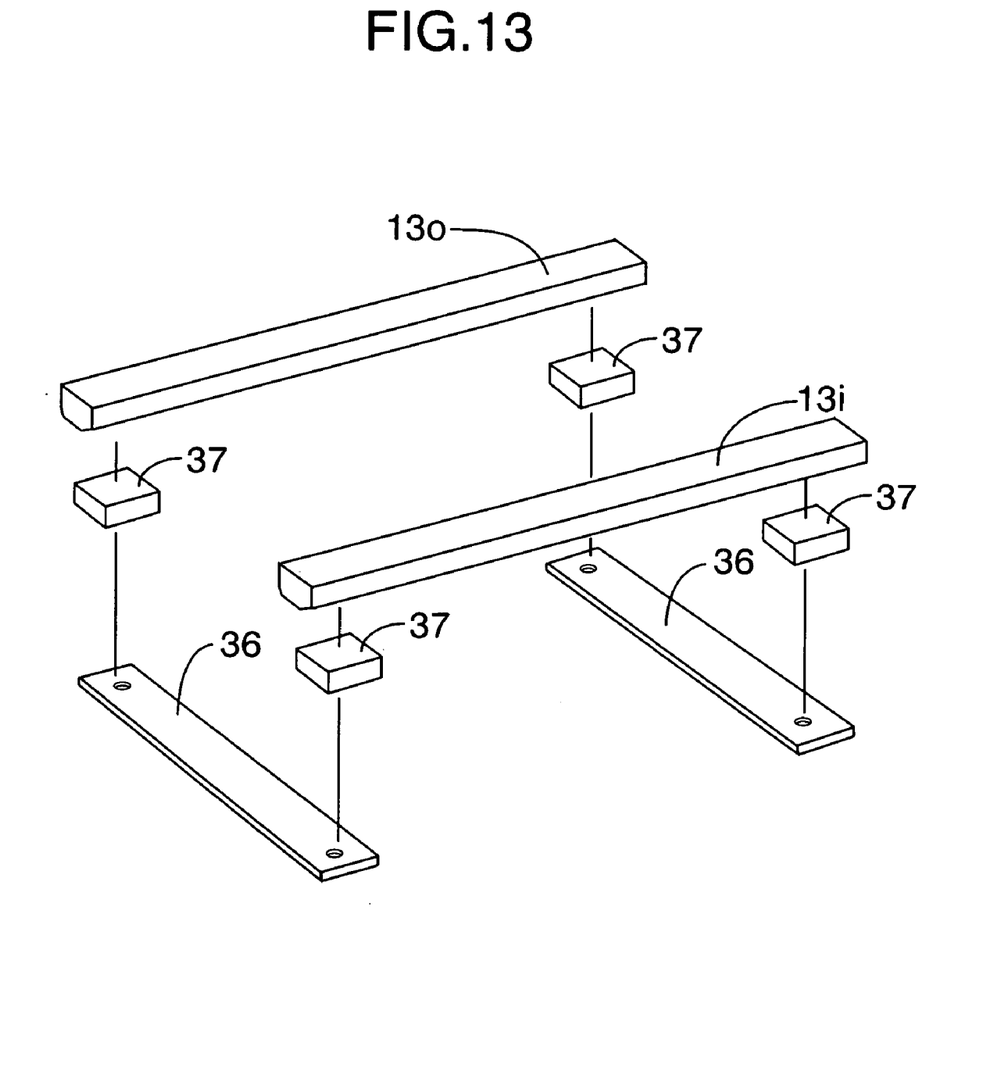
FIG. 13 is an explanatory diagram of an eighth embodiment.

An eighth embodiment shown in FIG. 13 is a modification of the above-mentioned sixth embodiment which employs the linking member 36 formed in a square frame shape, and employs two strip-shaped linking members 36.

In accordance with these seventh and eighth embodiments, the same effects as those obtained in the above-mentioned sixth embodiment can be attained.

Although embodiments of the present invention have been explained in detail above, the present invention can be modified in a variety of ways without departing from the subject matter of the present invention.

For example, in embodiments the weight of the occupant is detected in order to control deployment of an airbag, but the present invention is not limited to controlling the deployment of an airbag and can be used in any other application.

Furthermore, the linking member 36 is not limited to one made of iron sheet, and any material can be used as long as it has sufficient rigidity.

What is claimed is:

1. An occupant weight detection system comprising:
   first and second seat rails;
   a vehicle seat supported by the seat rails to permit movement of the seat in a direction parallel to the first and second seat rails;
   a plurality of weight detection means for sharing detection of the weight of an occupant seated on the vehicle seat; and
   a linking member for integrally linking the plurality of weight detection means so that the weight detection means maintain a predetermined positional relationship to each other;
   wherein the plurality of weight detection means are disposed below the first and second seat rails and the linking member.

2. An occupant weight detection system according to claim 1 wherein the linking member has a square frame shape, and two weight detection means disposed along opposite side edges of the seat are secured along two sides of the linking member in a longitudinal direction of a vehicle body.

3. An occupant weight detection system according to claim 1 wherein the linking member has a square frame shape, and four weight detection means disposed at four corners of the seat are secured at four corners of the linking member.

4. An occupant weight detection system according to claim 1 wherein the linking member comprises a pair of front and rear members extending in a lateral direction of a vehicle body, and front ends of two weight detection means disposed along opposite side edges of the seat are secured to right and left ends of the front member and rear ends thereof are secured to right and left ends of the rear member.

5. An occupant weight detection system according to claim 1 wherein the linking member comprises a pair of front and rear members extending in a lateral direction of a vehicle body, and four weight detection means are disposed at four corners of the seat, among which two front weight detection means are secured to right and left ends of the front member and two rear weight detection means are secured to right and left ends of the rear member.

* * * * *